US012727653B1

(12) United States Patent
Watson, Sr.

(10) Patent No.: US 12,727,653 B1
(45) Date of Patent: Sep. 8, 2026

(54) PROTECTIVE CASE FOR COLLECTIBLE CARDS

(71) Applicant: RW AW Collectibles LLC, Dallas, TX (US)

(72) Inventor: Ricky L. Watson, Sr., Dallas, TX (US)

( * ) Notice: Subject to any disclaimer, the term of this patent is extended or adjusted under 35 U.S.C. 154(b) by 134 days.

(21) Appl. No.: 18/605,326

(22) Filed: Mar. 14, 2024

Related U.S. Application Data

(63) Continuation of application No. 29/903,620, filed on Sep. 26, 2023, now Pat. No. Des. 1,024,551, which is a continuation of application No. 17/855,921, filed on Jul. 1, 2022, now abandoned.

(60) Provisional application No. 63/218,271, filed on Jul. 2, 2021.

(51) Int. Cl.
*G09F 1/12* (2006.01)
*A45C 11/18* (2006.01)

(52) U.S. Cl.
CPC ................ *A45C 11/18* (2013.01); *G09F 1/12* (2013.01)

(58) Field of Classification Search
CPC .................................. A45C 11/18; G09F 1/12
USPC ......... 206/454, 455; 220/6, 4.29, 23.2, 23.4, 220/23.83, 23.87
See application file for complete search history.

(56) References Cited

U.S. PATENT DOCUMENTS 3,150,457 A 9/1964 Thieme
4,979,619 A 12/1990 Hager
5,046,616 A 9/1991 Makowski et al.
5,097,953 A 3/1992 Gingras
5,283,967 A * 2/1994 Abrams .................... G09F 1/12 40/773
5,344,015 A 9/1994 Carlin
5,829,593 A 11/1998 Appleton
6,186,327 B1 2/2001 Hadden
D444,060 S 6/2001 Elsener, Sr. et al.
D469,963 S 2/2003 Ueno
7,272,903 B2 9/2007 Roy
7,673,749 B2 3/2010 Kosann
8,011,510 B1 9/2011 Smith, II et al.
8,063,933 B2 11/2011 Khait et al.
D742,220 S 11/2015 Eyerman et al.
(Continued)

FOREIGN PATENT DOCUMENTS

NZ 22264-0001 11/1988

OTHER PUBLICATIONS

Simply Genius (5 Pack Collectible Cards Storage Tray Holder for PRO Card Sleeves, Graded Sports Cards Slabs, for 3 Ring Binder, Graded by PSA. Amazon.com. https://www.amazon.com/Simply-Genius-Collectible-Storage-Trading/dp/B082LSBR4H?th=1 [Date accessed: Feb. 19, 2021]. ].
(Continued)

*Primary Examiner* — Jacob K Ackun
(74) *Attorney, Agent, or Firm* — Bold IP PLLC; Christopher Mayle

(57) ABSTRACT

The present invention is a protective case for collectible cards and other items, which provides a solution to the problem of protecting collectable items while shipping and displaying. The core components of the invention are a case with an indent configured to secure a collectable card or other item and a flat base configured to act as a base so the protective case is able to stand on end and display the collectable card or other item, and connective hinges configured to secure the connective hinges to other protective cases or other protective devices.

12 Claims, 3 Drawing Sheets

(56) References Cited

U.S. PATENT DOCUMENTS

| | | | | |
|---|---|---|---|---|
| 9,907,417 | B2 | 3/2018 | Brown, III | |
| D898,355 | S | 10/2020 | Cox | |
| D919,290 | S | 5/2021 | Glaser et al. | |
| 2009/0100731 | A1 | 4/2009 | Elvin | |
| 2009/0100732 | A1 | 4/2009 | Seidler | |
| 2009/0154665 | A1 | 6/2009 | Galvin et al. | |
| 2009/0297303 | A1 | 12/2009 | Hyobu | |
| 2010/0140126 | A1* | 6/2010 | Lu | B65D 85/48 206/455 |
| 2011/0095021 | A1* | 4/2011 | Clough | B65D 75/56 220/23.83 |
| 2016/0068303 | A1 | 3/2016 | Schroeder | |
| 2016/0145027 | A1 | 5/2016 | Bornstein | |
| 2020/0045152 | A1 | 2/2020 | Nottage | |
| 2023/0000227 | A1* | 1/2023 | Watson, Sr. | A45C 13/005 |
| 2023/0127622 | A1* | 4/2023 | Williams | A47G 1/06 40/711 |

OTHER PUBLICATIONS

Snap Together Hinge. Grabcad.com. https://grabcad.com/library/snap-together-hinge-1 [Date accessed: Feb. 19, 2021].

CollectorMount Card Mount for Graded PSA Trading and Sports Cards, 5 Frames, Stand and Wall Mount Display for Collectible Cards. Amazon.com. https://www.amazon.com/Graded-Trading-Sports-Display-Collectible/dp/B08KWHMDWD [Date accessed: Feb. 19, 2021].

Amazon.com, Site visited Nov. 2, 2023, BCW 1-HB55 Hinged Trading Card Box, Date first available, Jun. 19, 2015, https://www.amazon.com/BCW-1-HB55-Hinged-Trading-Card/dp/B00ZZ0RP5S (Year: 2015).

Amazon.com, Site visited Nov. 2, 2023, Ultra Pro Gaming Display Case, Date first available, Apr. 5, 2016, https://www.amazon.com/Ultra-Pro-Generic-Display-CaseDisplay/dp/B01CJ80ETW (Year: 2016).

* cited by examiner

PROTECTIVE CASE FOR COLLECTIBLE CARDS

CROSS REFERENCE TO RELATED APPLICATIONS

This application is a continuation of U.S. Design Pat. application Ser. No. 29/903,620 filed on Sep. 26, 2023 which is a continuation of U.S. Non-Provisional patent application Ser. No. 17/855,921 filed on Jul. 1, 2022 which claims priority to U.S. Provisional Patent No. 63/218,271 filed on Jul. 2, 2021, which are incorporated in their entirety.

BACKGROUND

Various forms of protective cases exist for collectable cards and other valuable items. Many collectable cards are graded and placed in a hard clear plastic case. The case is intended to be permanent in most cases and it is desirable to keep the case from being damaged so the view of the card is not encumbered by scratches and dents.

Collectable cards are normally shipped in boxes with protective filler such as packing peanuts or bubble wrap. Although this is generally adequate protection for a single card in a protective case, when several cards are shipped together they can often end up rubbing against one another and damaging each other. Also, the cards do not arrive in a presentable manner. The person receiving the cards has to carefully unwrap the cards and place the cards in a separate device for presentation.

Most devices used for presenting cards would provide very little protection for the cards or are too bulky to ship one or even a handful of cards.

SUMMARY

The disclosed device is unique when compared with other known devices and solutions because it provides a protective case that can be used both for shipping and for display.

The disclosed device is unique in that it is structurally different from other known devices or solutions. More specifically, the device is unique due to the presence of: (1) a case with an indent for a card or similar item and connecting items for connecting the protective case to another protective case or other protective component; and (2) and one or more fasteners allowing the protective card case to be connected to connected to other cases to be placed in a stacking configuration.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Figure 1:
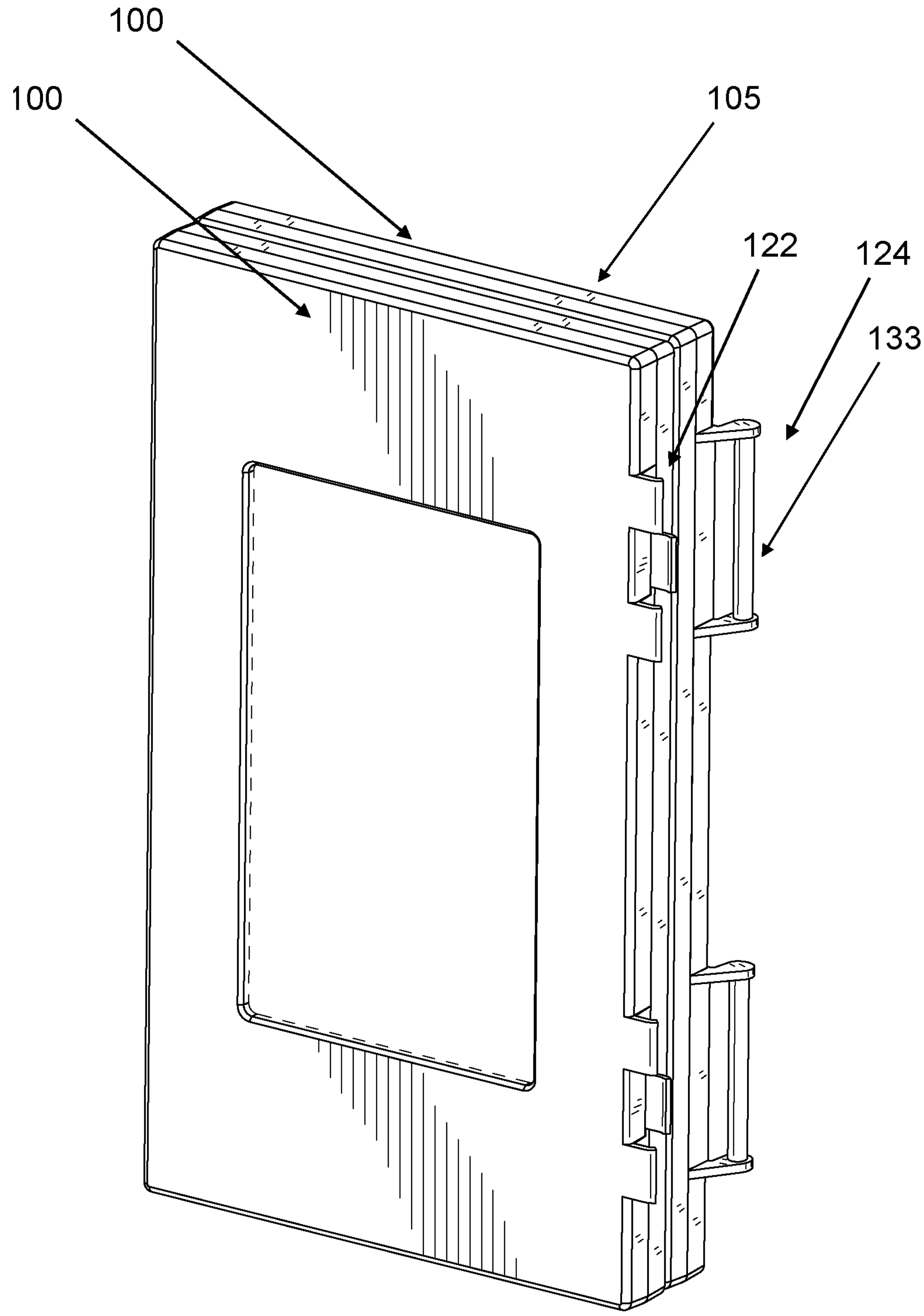
FIG. 1 shows card protectors in a closed position.
Figure 2:
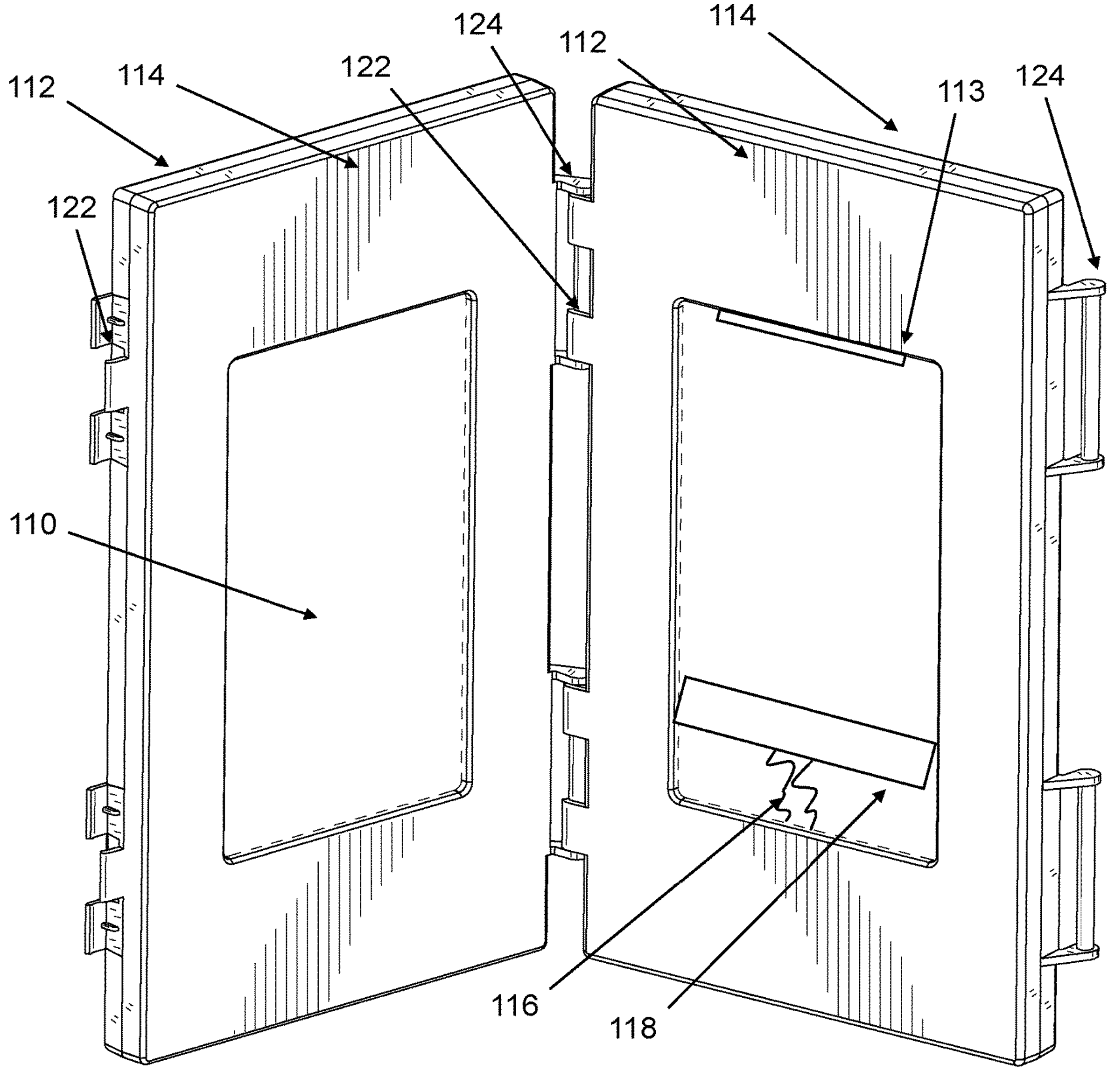
FIG. 2 shows card protectors in an open position.
Figure 3:
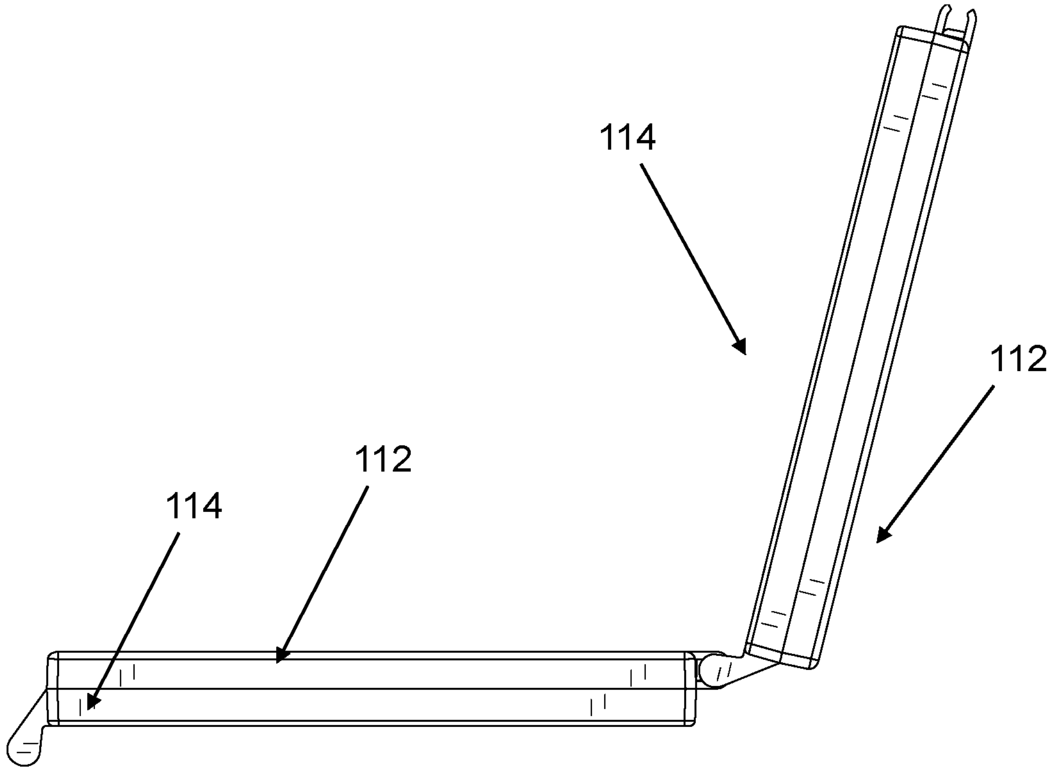
FIG. 3 shows another view in an open position.
Figure 4:
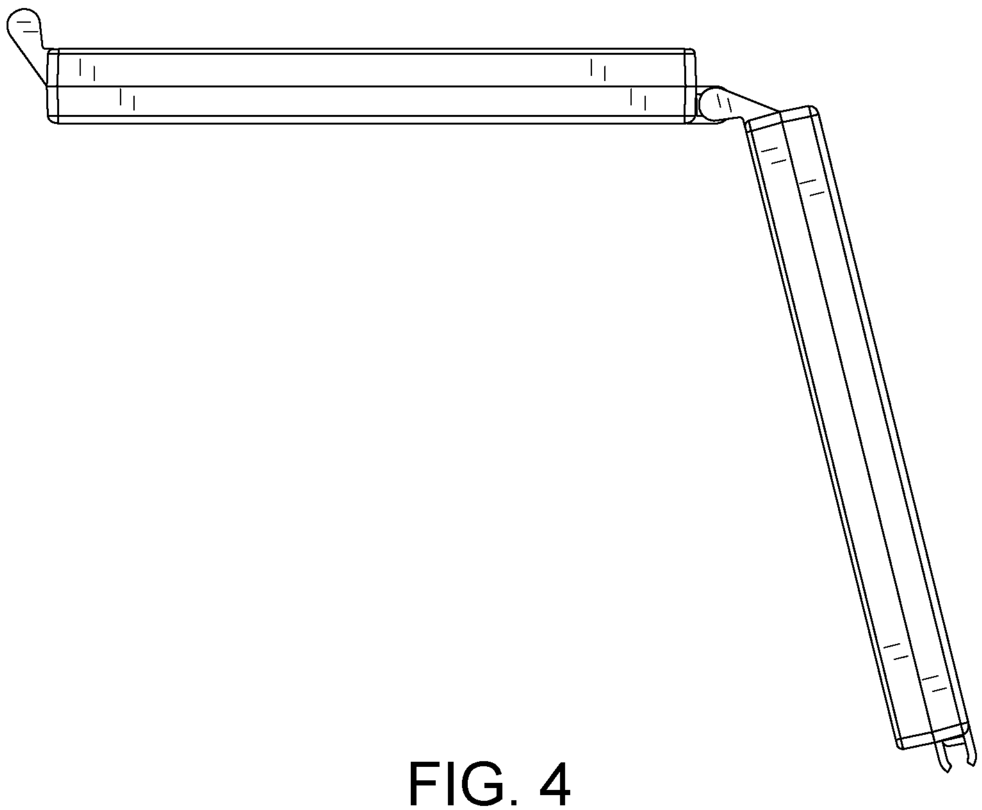
FIG. 4 shows another view in an open position

FIG. 1 shows an example front view of two connected protective cases 100. Each protective case 100 may have a body 105 that is made up of a front component 112 and rear component 114 that are removably connected to one another by one or more snap fit connections or friction fit whereby front component 112 fit on top of rear component 114, as illustrated in FIG. 2-4. Front component 112 and rear component 114 may be rectangular prism in shape. Protective case 100 may have a height of 5-7 inches, width of 4-5 inches and depth of about 0.75-1.25 inches. Protective cases 100 that hold more than one card case or another item are also possible. For example, multiple indents 110 may be included in a protective case 100.

Rear component 114 may be of a predefined thickness extending from an interior front surface to an exterior rear surface whereby rear component 114 may have an indent 110 positioned at a center. Indent 110 may extend downward past the top surface towards the bottom surface such that indent 110 may act as a receiving cavity for a card or card case The indent 110 may have a rectangular prism shape as well (which may be complementary to the shape of a collectable card or card case). However, indent 110 may be of different shapes and sizes depending on the situation and need for holding a card or card case. Standard collectable cards (not shown) may be 3.5 by 2.5 inches. A card case (not shown) for a standard collectible card may be about 4.5 by 3 inches and about 0.25 inches thick. The indent 110 may be slightly larger than the size of the card or card case. It may be advantageous to have the indent 110 be deeper than the thickness of the card case to provide some protection to the card case from objects rubbing the front face of the protective case 100.

Front component 112 may have a series of first connectors 122 in the form of receptacles. One of the first connectors 122 may be positioned at a first side of protective case 100 near or at a top of rear component with components at or near the rear surface and at or near the middle of front component 112 between the front and rear surface. A second of the first connectors 122 may also be positioned at first side of protective case 100 near or at a bottom of rear component with components at or near the rear surface and at or near the middle of rear component 114 between the front and rear surface.

Rear component 114 may have a series of second connectors 124 in the form of locking bars 133 that extend diagonally outward away from first connectors 122. One of the first connectors 122 may be positioned at a first side of protective case 100 near or at a top of rear component 114. A second of the second connectors 124 may also be positioned at the first side of protective case 100 near or at a bottom of Rear component 114.

The first connectors 122 may receive the second connectors 124 whereby the bar of the first connectors 122 is snapped into place on the receiving component of second connectors 124. This allows the protective cases to be a part of a hinge system for connecting protective cases 100 and other protective devices together in a way that connected protectives cases 100 and other protective items can close (e.g., go face to face) for shipping and storage and open for display and standing on end.

In the closed position a first protective case 100 may rest on top of a second protective case where the front surfaces of the first protective case and the second protective case may be touching. may be about parallel, in an open position the front faces may be about 90-180 degrees from each other. In some embodiments, the protective case 100 may also be balanced such that the protective case will balance/stay up when stood up on the bottom side (with or without a card case or other item in the indent 110).

In some embodiments, the card case or other item may be held in the indent 110 by friction between protective cases 100 and the card case or other item. However, in one or more non-limiting embodiments different features may be included to improve friction or otherwise help secure the card case or other item in the indent 110.

Indent 110 may have one or more friction pads 113. The friction pads may include a material with at least one of greater elasticity and greater surface friction than the material of the protective cases 100. The friction pads 113 may include rubber, silicone, adhesive putty, or other similar materials. The friction pads 113 may provide additional friction between the card case or other item and the protective cases 100 to hold the cards or other items in the indent 110 in the protective cases 100. The friction pads 113 may be arranged on one or more sides of the indent 110. In some embodiments, friction pads 113 may be included on all sides of the indent 110. Indent 110 may have an upper semi hemispherical or hemispherical portion allowing for easier removal of cards.

Indents 110 may also have one or more pressing plates 116. The pressing plate 116 and at least one spring 118 or other pressing device may be included in the indent 110 and configured to press a card case or other item in the indent by pressing the card case or other item into a wall of the indent opposite the pressing plate 116. The pressing plate may include a hard material such as metal, plastic, or similar materials, and may also include a high friction material such as rubber, silicone, or other similar materials over the hard material.

The protective case 100 may include one or more of the friction pads 113, pressing plate 116 and springs 118, and turn button 130. For example, the protective case 100 may include friction pads 113 in the indent 110 and one or more turn buttons 130 on the front face of the protective cases 100 beside the indent 110. Protective cases 100 may also include similar friction pads 113, pressing plate 116 and springs 118, and turn button 130.

Advantageously, the protective cases 100 may secure and protect card cases and other items in indents. The protective cases 100 may also advantageously be connected to other protective cases whereby they rotate relative to one another from a closed position the indents 110 overlap and an open position where the items in the indents may be viewed and displayed with the protective cases standing on a bottom side. The connection between the protective cases 100 also advantageously allows for additional stabilization when the protective cases 100 are connected stood on end (especially when in a ‘v’ shape, ‘w’ shape, or similar shape).

Also, the protective cases 100 have the advantage of being both protective for shipping and storage in a compact grouping where they are folded on top of one another and also being useful for displaying the protected card case or other item.

Accordingly, the present description provides for various embodiments for a protective case 100. Many uses and advantages are offered by the protective case 100 as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

The invention claimed is:

1. A protective case system comprising:

a first protective case wherein the first protective case includes a front component and a rear component with an indent configured to protect a card or card holder in the indent, wherein the first protective case includes a first connector extending from a side surface of the front component and a second connector in a form of a locking bar extending outward from a side surface of the rear component and configured to be received by a first connector on a side surface of the front component of a second protective case; and a second protective case, wherein the first connector of the second protective case is connected to the the second connector of the of the first protective case such that the first protective case is able to rotate relative to the second protective case to a closed position and an open position where the first protective case and the second protective case are parallel or diagonal to one another.

2. The protective case system of claim 1, wherein the front component and the rear component of each of the first protective case and the second protective case are connected by a snap fit connection wherein the front component fits on top of the rear component.

3. The protective case system of claim 1, wherein in the closed position the first protective case rests on top of the second protective case such that front surfaces of the first protective case and the second protective case are touching.

4. A protective case system comprising: a protective case wherein the protective case includes a rear component with an indent and a front component that is removably fastened to the rear component to protect a card or card holder in the indent, wherein the protective case includes a first connector extending from a side surface of the front component and a second connector in a form of a locking bar extending out from a side surface of the rear component and configured to be received by a first connector on a front component of a second protective case to form a hinge system for connecting multiple protective cases together.

5. The protective case system of claim 4, wherein the first connector of each of the first protective case and the second protective case is positioned at or near a first side of the protective case.

6. The protective case system of claim 5, wherein the second connector is positioned at or near a second side of the protective case.

7. The protective case system of claim 4, wherein the indent has a rectangular shape.

8. The protective case system of claim 4, wherein the indent has a rectangular shaped bottom component and a semi-hemispherical or hemispherical upper portion allowing for removal of cards.

9. The protective case system of claim 4, wherein a pressing plate with one or more springs is positioned inside of the indent.

10. The protective case system of claim 4, wherein one or more friction members are positioned in the indent.

11. The protective case system of claim 4, wherein the indent has a pressure plate with one or more springs or one or more friction members are positioned in the indent to further secure the card or the card holder.

12. A protective case system for shipping and displaying collectible cards, comprising:

a first protective case having a body made up of a front component and a rear component that are removably connected to one another, wherein the rear component has an indent configured as a receiving cavity for a card or card case, wherein the front component has a first connector in a form of a receptacle positioned at a first side of the first protective case, and wherein the rear component has a second connector in the form of a locking bar that extends outward from a second side of the first protective case;

a second protective case having same structure as the first protective case, wherein a first connector of the second protective case receives the second connector of the first protective case to connect the first protective case to the second protective case; and wherein the connection between the first connector of the second protective case and the second connector of the first protective case forms a hinge system such that the first protective case and the second protective case are configured to rotate relative to one another between:

a closed position for shipping and storage wherein the first protective case rests on top of the second protective case with front surfaces of the first protective case and the second protective case touching, and an open position for display wherein front surfaces of the first protective case and the second protective case are 90 to 180 degrees from each other, and wherein the first protective case and the second protective case are configured to stand on a bottom side for displaying the card or card case in the indent.

* * * * *